Nov. 2, 1937.   J. E. REDFORD   2,097,533
SLACK ADJUSTER FOR AIR BRAKES
Filed June 1, 1936   2 Sheets-Sheet 1
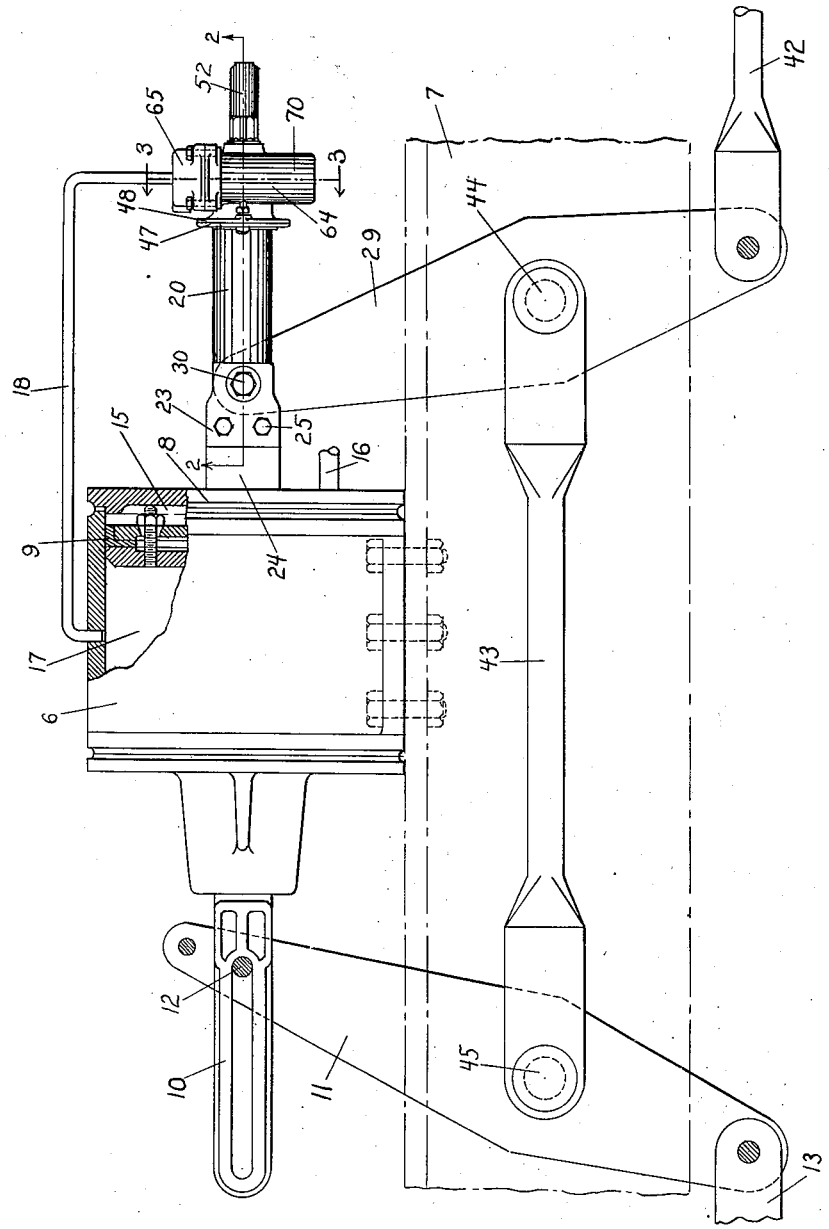

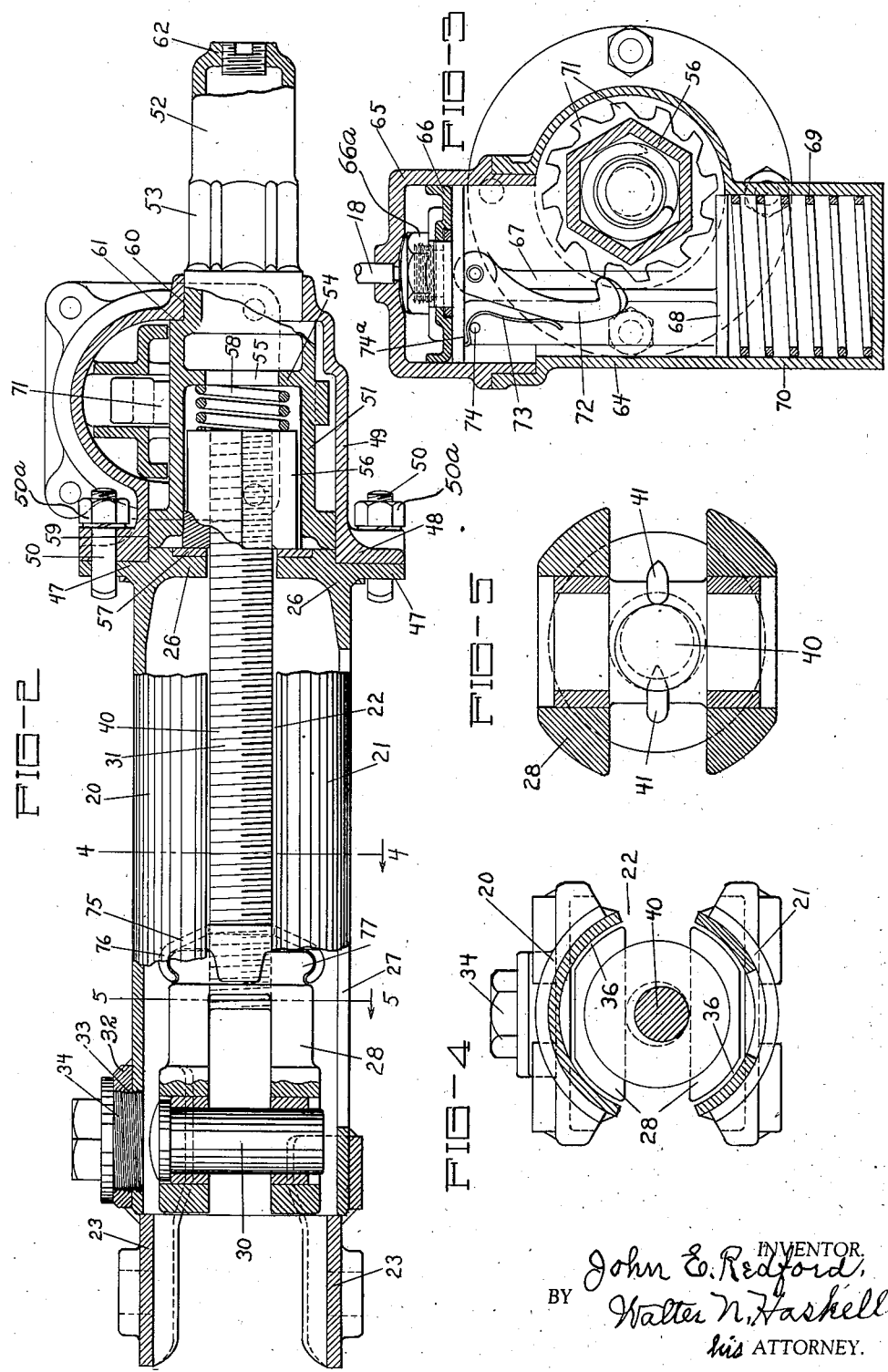

Patented Nov. 2, 1937

2,097,533

UNITED STATES PATENT OFFICE 2,097,533

SLACK ADJUSTER FOR AIR BRAKES

John E. Redford, St. Louis, Mo.

Application June 1, 1936, Serial No. 82,692

14 Claims. (Cl. 188—203)

My invention has reference to a slack adjuster for air brakes, of that type which automatically takes up any slack in the brake rigging, such as may be caused by wear of the brake shoes or other parts, and its chief purpose is to insure a uniform operation and efficient action of the brakes at all times. The invention also pertains to that class of such devices which are supplied with fluid under pressure from the brake cylinder when the piston has moved a predetermined distance in applying the brakes, and which, upon the release of such fluid under pressure, operates to take up the slack.

Another purpose of the invention is to provide an improved slack adjuster of the above type in which the parts are so constructed and arranged that fit allowances can be restricted and readily held within definite control so that the entire mechanism will resist wear and undesired displacement of parts due to vibration.

Another feature thereof is the arrangement for spring contact of some of the operative parts, and means for manual control thereof to cause the release of other parts in case they become locked.

The above named, and other features and advantages of the invention will more fully appear from the following specification, reference being had to the accompanying drawings, in which;

Fig. 1 is a plan view of a brake rigging embodying the invention.

Fig. 2 is a longitudinal section on the broken line 2—2 of Fig. 1.

Fig. 3 is a cross-section on the line 3—3 of Fig. 1.

Fig. 4 is a cross-section on the line 4—4 of Fig. 2.

Fig. 5 is a cross-section on the line 5—5 of Fig. 2.

Fig. 1 shows a brake system which embodies the invention, and in which the ordinal 6 indicates a brake cylinder of usual construction, attachable to some part of the frame-work of a railway car or truck, shown in broken lines at 7. The cylinder 6 is provided at one end with a head 8, with which is connected the frame or casing for the slack adjustment unit, as hereinafter set forth. Within said cylinder is a piston 9, having a rod 10 which is operatively connected with one end of a brake lever 11, by means of a pin 12. The other end of said lever has a pivotal connection with a tension rod 13, which is connected with the brakes of the car in the usual manner, and not shown in the drawings herein.

Between the piston 9 and cylinder head 8 is a space or chamber 15, to which fluid under pressure is supplied by means of a pipe 16, whereby movement is applied to the piston for the purpose of actuating the brakes. On the other side of the piston is a chamber 17, which is in communication with the atmosphere in the usual manner. A pipe 18 communicates with the chamber 17 at one of its ends, and at its other end with the slack adjustment mechanism, in a manner hereinafter set forth. When the brake actuating parts are in a normal condition the movement of the piston is not sufficient to open the vent to said pipe, but as some of the parts become worn, as mentioned, the piston will pass beyond the end of the pipe 18, and a portion of the air in the chamber 15 will pass through said pipe, to exert its force upon the adjustment devices.

One part of the slack adjuster mechanism consists of a frame or casing formed of an upper plate 20 and a lower plate 21, preferably of semicircular formation as shown, and separated by lateral spaces 22. At one end said plates are provided with extensions 23, secured to a lug 24 projected from the cylinder head, by means of bolts 25, and at the other end are integrally united by a web 26. The lower plate 21 is also provided with a longitudinal opening 27, for the escape of dirt and other foreign matter by gravity.

A cross-head 28 of circular formation is slidably mounted between the plates 20 and 21, and is pivotally connected at one end to one end of a fulcrum lever 29 by means of a pin 30. Adjacent the head of the pin 30 the plate 20 is fitted with a boss 32, through which plate and boss passes an opening 33, threaded to receive a similarly threaded plug 34. The opening is sufficiently large to permit the insertion of the pin 30, and the plug prevents the accidental release thereof. There is a uniform lateral displacement between the cross-head 28 and plates 20 and 21, as indicated at 36, Fig. 4.

By reason of the construction shown there is no resistance to lateral displacement, as there is in former devices of this kind. The cross-head 28 and casing 20—21 have free rocking movement relatively to each other. In earlier devices of this type the resistance interferes with the free operation of the cross-head or similar part, with a resulting binding action on the screw, and hindrance thereby to a free operation.

Secured to that end of the cross-head 28 opposite to the pin 30 is an adjusting screw 40, by means of weld keys 41, which hold the screw from rotation independently of the cross-head.

The other end of the lever 29 is pivoted to one end of a tension rod 42, and said lever is connected with the lever 11, intermediate the ends of said levers, by a connecting rod 43 and pins 44 and 45. Although not shown in the drawings, the other end of the tension rod 42 is connected with other parts of the brake rigging to transmit the force of said lever to the vehicle brakes in the usual manner.

The web 26 has a central opening for the passage of the screw 40, and projected outwardly from said web is an annular flange 47, to which is attached a similar flange 48 on a casing 49, by means of bolts 50 threaded at their ends to receive nuts 50a. Rotatable within the casing 49 is a ratchet member 51 of cylindrical form, provided with an extension 52, on which is a tool hold 53. Within the member 51 is a circular web 54, having an opening 55 for the passage of the screw 40, and on the screw 40 within said member 51 is a nut 56, threaded for engagement with the thread on said screw. The nut is of hexagonal or other irregular shape, and is adapted to turn with the ratchet member. Said nut has a bearing at one end against a washer 57 in the web 23, and at the other end an extensile coiled spring 58 is interposed between said nut and the web 54, and holding said nut in tight engagement with the washer 57. The spring 58 also has a shock-absorbing or dampening effect, tending to hold the nut 56 and screw 40 yieldably against the action of the cross-head. At one end the member 51 has a bearing face 59 in contact with the inner wall of the casing 49, and at the other end with a bearing face 60, also in contact with the wall of said casing. Adjacent to the face 60 is a shoulder 61, in contact with the inner wall of the casing 49, and forming a seal between said parts to prevent the entrance of sediment into the casing. This seal is made positive by the spring 58, the force of which is exerted in one direction against the web 54, and in the other direction against the nut 56.

The washer 57 facilitates maintenance against wear, and assists in securing economical friction coefficient when desired. The combined casing and ratchet member hereinbefore described are calculated to give a maximum amount of facility and service. In practice, there is a limited fit allowance between the thread on the screw 40 and that of the nut 56 which provides for some lateral displacement of the cross-head without imparting impulse to said ratchet member. Combined with this fit allowance is a similar fit allowance between the nut 56 and ratchet member 51, which also operates to provide for sufficient lateral displacement of the cross-head without imparting impulse or vibration to the ratchet member.

The end of the extension 52 has a threaded perforation to receive a pipe plug 62 to provide a support for a core when the ratchet member is being cast. Other means can be employed for such purpose.

Mounted in the casing 49 transversely thereof is a cylinder 64, provided with a head 65, which is in communication with the cylinder 6 through the pipe 18. In said cylinder is a piston 66, having a rod member 67, at one end of which is a plate 68 bearing against a coiled spring 69 in an extension 70 of the cylinder 64 forming a pocket for said spring. On the end of the piston 66 is seated a nut 66a, which normally closes the end of pipe 18. The ratchet member 51 is provided on its circumference with a series of ratchet teeth 71, engageable by a pawl 72 pivoted on the piston rod frame 67. Engagement of said pawl with the teeth of the ratchet is enforced by means of a spring 73, held at one end between a pin 74 and lug 74a on the piston frame.

The piston 66 is held yieldably in an inactive position by the spring 69, and upon fluid pressure being admitted to the cylinder 64 the piston is moved downwardly, with the pawl 72 passing downwardly over one or more of the ratchet teeth. Upon the fluid pressure being released the piston moves upwardly again, with the pawl in engagement with one of said teeth, causing a partial rotation of the ratchet 51 and moving the screw 40 and cross-head 28 in a direction to take up the slack in the brake rigging. This movement is repeated whenever necessary.

The spring 69 possesses an initial tension, tending to hold the piston upwardly, with the nut on the head of said piston in position to close the opening in the pipe 18 against a predetermined amount of force in said pipe. The spring also exerts sufficient force at all times to dampen the vibratory action of any of the parts in the cylinder 64.

To prevent the end of the cross-head 28 becoming jammed against the web 26 on account of overtravel, a spring is interposed between such parts, preferably by attachment of a cushion spring to the end of the cross-head, as shown at 75, said spring being provided with arms 76 which engage with a bead 77 on the end of the cross-head. In the event of the pawl 72 becoming locked with one of the teeth of the ratchet with the spring in engagement with the casing as mentioned, a release can be effected by the application of a wrench or similar tool to the tool hold 53, and the rotation of the part 52 and housing 51 in a direction to release the pawl. By this operation the spring 75 receives an additional compressive force. The spring 75 can be provided with an initial tension, or it can be without tension at the start, and the spring action result from its contact with the end of the casing.

What I claim, and desire to secure by Letters Patent, is:

1. In a device of the class described, a casing, a cross-head mounted in said casing for reciprocation, and operatively connected with the brake actuating devices of a car, a shaft in said casing connected with said cross-head, fluid actuated means for imparting movement to said shaft, and a cushion spring on the end of said cross-head for impact with the end of said casing.

2. In a device of the class described, a casing, a cross-head mounted in said casing for reciprocation, operatively connected with the brake actuating devices of a car, a shaft in said casing connected with said cross-head, a ratchet device operatively connected with said shaft to give gradual movement thereto, a spring-pressed pawl for engagement with said ratchet device, fluid actuated means for actuating said pawl, means for maintaining said last named means under stress, and a cushion spring on the end of said cross-head to interrupt the movement of said shaft at a predetermined point, and insuring a releasable engagement of the pawl and ratchets at all times.

3. In a slack adjuster for air brakes, a casing, a screw member in said casing, connections between said screw member and actuating devices for the brakes of a car, a travelling nut on said screw, a resilient member cushioning said nut during momentary lateral, axial, horizontal displacement thereof due to vibration, means for rotating said nut to give a gradual movement to said screw, and fluid pressure mechanism for actuating said last-named means.

4. In a device of the class described, a casing formed of a pair of semi-circular plates, spaced from each other during the greater part of their length, an auxiliary casing attached thereto, a cross-head in said casing operatively connected with the actuating mechanism of the brakes of a car, a threaded shaft connected with said cross-head in said casing and extending through said auxiliary casing, a travelling nut on said shaft in said auxiliary casing, a cylinder supported transversely of said auxiliary casing, a piston in said cylinder and actuating element thereon, means operable by said element to impart rotation to said nut, to cause a gradual movement of said shaft, means for supplying said cylinder with a fluid pressure medium, and means for holding said piston yieldably against said pressure.

5. In a device of the class described, a tubular casing with longitudinal openings on its sides, a cross-head of circular form in said casing with uniform lateral displacement therefrom, and means connected with said cross head for actuating same.

6. In a slack adjuster, a tubular casing with longitudinal openings in its sides, a cross-head of circular form in said casing, a shaft supported in said casing and operatively connected with said cross-head, means for applying fluid pressure to said shaft to gradually move the same, including a resilient member exerting force greater than the force of said fluid pressure when the normal travel of the cross-head has been exceeded to prevent binding of the cross-head and casing, and means for manual operation of said resilient member.

7. In a slack adjuster, a tubular casing, a circular cross-head movable longitudinally therein, means for actuating said cross-head under fluid pressure, a spring associated with said cross-head to prevent the same from becoming jammed in the casing, and manual means for compressing said spring upon the predetermined length of movement of the cross-head being exceeded, to release said parts, and permit re-setting thereof.

8. In a slack adjuster, a cross-head mounted for longitudinal movement and operatively connected with the brake rigging of a car, a screw connected with said cross-head, a nut on said screw, adapted for imparting longitudinal movement thereto, a bearing for said nut, a ratchet sleeve enclosing said nut, and capable of imparting rotation thereto, a casing enclosing said ratchet sleeve with bearing surfaces between the casing and sleeve, and a seal contact between said parts at one end thereof, an extensile coiled spring between said nut and ratchet sleeve exerting force in one direction to enforce said seal, and in the opposite direction to hold said nut against its bearing, and fluid actuated means for operating said ratchet.

9. In a slack adjuster, a casing attachable to the air cylinder of a railway car, a cross-head capable of longitudinal movement in said casing, and operatively connected, with the brake-rigging of a car, a screw connected with said cross-head, a nut on said screw adapted to impart longitudinal movement thereto, a bearing for one end of said nut, a ratchet sleeve enclosing said nut and capable of giving rotation thereto, a casing enclosing said ratchet sleeve with bearing surfaces between said casing and sleeve, fluid pressure means for imparting movement to said ratchet sleeve, and an extensile coiled spring between said nut and said sleeve, there being a limited fit allowance between the thread of the screw and the thread of the nut providing some lateral displacement of the cross-head without imparting impulse to the ratchet-sleeve.

10. In a slack adjuster, a casing attachable to the air cylinder of a railway car, a cross-head capable of longitudinal movement in said casing, and operatively connected, with the brake-rigging of a car, a screw connected with said cross-head, a nut on said screw adapted to impart longitudinal movement thereto, a bearing for one end of said nut, a ratchet sleeve enclosing said nut and capable of giving rotation thereto, a casing enclosing said ratchet sleeve with bearing surfaces between said casing and sleeve, fluid pressure means for imparting movement to said ratchet sleeve, and an extensile coiled spring between said nut and said sleeve, there being a fit allowance between the nut and ratchet-sleeve which provides a lateral displacement of the cross-head without imparting the impulse thereof to said ratchet-sleeve.

11. In a slack adjuster, a casing attachable to the air cylinder of a railway car, a cross-head capable of longitudinal movement in said casing, and operatively connected, with the brake-rigging of a car, a screw connected with said cross-head, a nut on said screw adapted to impart longitudinal movement thereto, a bearing for one end of said nut, a ratchet sleeve enclosing said nut and capable of giving rotation thereto, a casing enclosing said ratchet sleeve with bearing surfaces between said casing and sleeve, fluid pressure means for imparting movement to said ratchet sleeve, and an extensible coiled spring between said nut and said sleeve, there being a limited fit allowance between the thread of the screw and the thread of the nut providing some lateral displacement of the cross-head without imparting impulse to the ratchet-sleeve, there also being a fit allowance between the nut and ratchet-sleeve which provides a lateral displacement of the cross-head without imparting the impulse thereof to said ratchet-sleeve.

12. In a slack adjuster, a casing attachable to the air cylinder of a railway car, a cross-head mounted to reciprocate therein and operatively connected with the brake rigging of said car, a cylindrical ratchet member, rotatably mounted in said casing, a nut movable telescopically within said member and rotatable therewith, a screw operable within said nut and connected with said cross-head, and fluid actuated apparatus for the operation of said ratchet member, to turn said nut, said ratchet member and nut having a seal contact with said casing at their opposite ends.

13. In a slack adjuster, a casing attachable to the air cylinder of a railway car, a cross-head mounted to reciprocate therein and operatively connected with the brake rigging of said car, a cylindrical ratchet member rotatably mounted in said casing, a nut movable telescopically in said member and rotatable therewith, a screw operable within said nut and connected with said cross-head, fluid actuated apparatus for the operation of said ratchet member, to turn said nut, said ratchet member and nut having a seal contact with said casing at their opposite ends, and spring means between said member and said nut for enforcing said seals, and dampening the vibratory action on said parts.

14. In a lack adjuster, a casing attachable to the air cylinder of a railway car, a cross-head mounted to reciprocate therein, and operatively connected with the brake rigging of said car, a cylindrical ratchet member rotatably mounted in said casing, a nut movable telescopically in said ratchet member and rotatable therewith, a screw operable in said nut and connected with said cross-head, a spring separating said ratchet member and said nut, dampening the vibratory action thereon, a fluid actuated apparatus for the operation of said ratchet member, including a cylinder and piston, and a spring between said casing and piston, dampening the vibratory action on said last named parts.

JOHN E. REDFORD.